US009242374B2

(12) United States Patent
Oaki (10) Patent No.: US 9,242,374 B2
(45) Date of Patent: Jan. 26, 2016

(54) ROBOTIC CONTROL APPARATUS

(71) Applicant: KABUSHIKI KAISHA TOSHIBA, Minato-ku, Tokyo (JP)

(72) Inventor: Junji Oaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 13/960,248

(22) Filed: Aug. 6, 2013

(65) Prior Publication Data

US 2014/0046483 A1 Feb. 13, 2014

(30) Foreign Application Priority Data

Aug. 10, 2012 (JP) ................................. 2012-178395

(51) Int. Cl.
 *B25J 9/16* (2006.01)
(52) U.S. Cl.
 CPC .................. *B25J 9/1633* (2013.01); *B25J 9/16* (2013.01); *Y10S 901/09* (2013.01); *Y10S 901/20* (2013.01)
(58) Field of Classification Search
 CPC ...... B25J 9/1638; B25J 9/1633; B25J 9/1641; B25J 9/1605; B25J 9/16
 See application file for complete search history.

(56) References Cited

U.S. PATENT DOCUMENTS

| 6,822,415 | B1 * | 11/2004 | Komiya et al. ............... 318/629 |
| 7,765,023 | B2 | 7/2010 | Oaki et al. |
| 2002/0079857 | A1 * | 6/2002 | Ishii et al. ................. 318/568.12 |
| 2005/0080513 | A1 * | 4/2005 | Ito ................................. 700/245 |
| 2006/0108958 | A1 * | 5/2006 | Brenner ......................... 318/432 |
| 2010/0198405 | A1 * | 8/2010 | Hacker et al. ................. 700/251 |
| 2013/0006422 | A1 * | 1/2013 | Komatsu ....................... 700/258 |
| 2013/0073085 | A1 | 3/2013 | Oaki et al. |
| 2014/0039678 | A1 * | 2/2014 | Motoyoshi .................... 700/258 |

FOREIGN PATENT DOCUMENTS

| JP | 03-117580 | 5/1991 |
| JP | 07-060667 | 3/1995 |
| JP | 07-120212 | 5/1995 |

(Continued)

OTHER PUBLICATIONS

Urushihara, Shiro et al. Robust Load Position Servo System without Vibration and End-Effector Offset for Industrial Robots, ISIE 2009, 409-414.*

(Continued)

*Primary Examiner* — Khoi Tran
*Assistant Examiner* — Ryan Rink
(74) *Attorney, Agent, or Firm* — Amin, Turocy & Watson, LLP (57) ABSTRACT

According to one embodiment, a robotic control apparatus includes a physical parameter switching unit, an observer unit, and a state feedback unit. The physical parameter switching unit switches a physical parameter set in accordance with a value of a mass of an end effector load of a robotic arm. The observer unit estimates an angular velocity of a link based on a simulation model of a motor angular velocity control system which undergoes gain proportional-integral control equivalent to a proportional-integral control of the angular velocity control system. The state feedback unit calculates an axial torsional angular velocity based on a difference between the angular velocity of the motor, and the angular velocity of the link, and feed the calculated axial torsional angular velocity back to the angular velocity control system.

6 Claims, 9 Drawing Sheets

(56) References Cited

FOREIGN PATENT DOCUMENTS

| JP | 2772064 | 7/1998 |
| JP | 2000-148210 | 5/2000 |
| JP | 2004-322224 | 11/2004 |
| JP | 2006-116631 | 5/2006 |
| JP | 4289275 | 7/2009 |
| JP | 2012-061567 | 3/2012 |
| WO | 2012077335 | 6/2012 |

OTHER PUBLICATIONS

Japanese Office Action for Japanese Application No. 2012-178395 mailed Jul. 29, 2014.

Final Office Action for Japanese Patent Application No. 2012-178395 Dated Apr. 7, 2015, 6 pages

* cited by examiner

ROBOTIC CONTROL APPARATUS

CROSS-REFERENCE TO RELATED APPLICATIONS

This application is based upon and claims the benefit of priority from Japanese Patent Application No. 2012-178395, filed Aug. 10, 2012, the entire contents of which are incorporated herein by reference.

FIELD

Embodiments described herein relate generally to a robotic control apparatus which controls, for example, a multi-link robotic arm.

BACKGROUND

To suppress vibration of the distal end of a multi-link robotic arm, it is necessary to estimate the axial torsional angular velocity (the difference between the link angular velocity and the motor angular velocity) based on the motor angular velocity, measured by an internal motor encoder which drives each shaft, and feed it back to a motor angular velocity control system. This estimation operation requires an observer based on a nonlinear dynamic model that takes into consideration elastic joints, and nonlinear interference forces acting between the links.

Attainment of a multi-input multi-output nonlinear observer as described above requires creation of an accurate dynamic model, and a given robustness against variations in end effector load/frictional force. Conventionally, an approximate observer based on one-input one-output linear model+α for "Elastic Joint Model for Each Link+Disturbance Estimation and Compensation from Other Links" has mainly been used to reduce the amount of computation of control.

Also, with the recent improvements in performance of a CPU and memory, a robotic control apparatus can also achieve various computing powers and storage capacities.

DETAILED DESCRIPTION

In general, according to one embodiment, a robotic control apparatus including an angular velocity control system which, assuming as a controlled object a robotic arm including an elastic mechanism between a rotation axis of a motor and a rotation axis of a link, the apparatus includes a physical parameter switching unit, an observer unit, and a state feedback unit. The physical parameter switching unit is configured to switch a physical parameter set, including a moment of inertia, a friction coefficient, and a spring modulus which are set for a nonlinear dynamic model of the robotic arm, in accordance with a value of a mass of an end effector load of the robotic arm. The observer unit is configured to receive an angular velocity of the motor, and a current command value input to the motor, hold the nonlinear dynamic model, and estimate an angular velocity of the link based on a simulation model of a motor angular velocity control system which undergoes gain proportional-integral control equivalent to the proportional-integral control of the angular velocity control system. The state feedback unit is configured to calculate an axial torsional angular velocity based on a difference between the angular velocity of the motor, and the angular velocity of the link, and feed the calculated axial torsional angular velocity back to the angular velocity control system.

A robotic control apparatus according to this embodiment will be described hereinafter with reference to the drawings.

Figure 1:
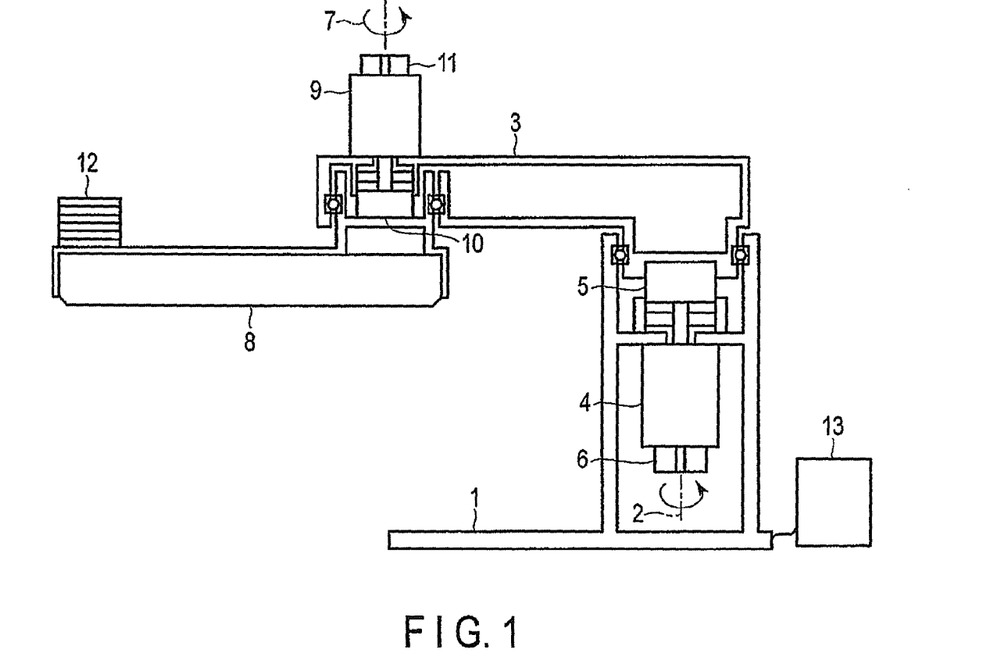
FIG. 1 is a sectional view of a robotic arm as an example of an object controlled by a robotic control apparatus according to this embodiment.

FIG. 1 is a sectional view of a two-link robotic arm as an example of an object controlled by a robotic control apparatus according to this embodiment. This robotic arm includes a mount 1, first link 3, first motor 4, first decelerator 5, first encoder 6, second link 8, second motor 9, second decelerator 10, and second encoder 11. The first link 3 has its one end attached to the upper portion of the mount 1, and its other end attached to the second link 8.

A control device 13 horizontally pivots the first link 3 about a first axis 2 with respect to the mount 1 using a combination of the first motor 4, the first encoder 6, and the first decelerator 5 having spring characteristics. The control device 13 also horizontally pivots the second link 8 about a second axis 7 with respect to the first link 3 using a combination of the second motor 9, the second encoder 11, and the second decelerator 10 having spring characteristics.

Figure 2:
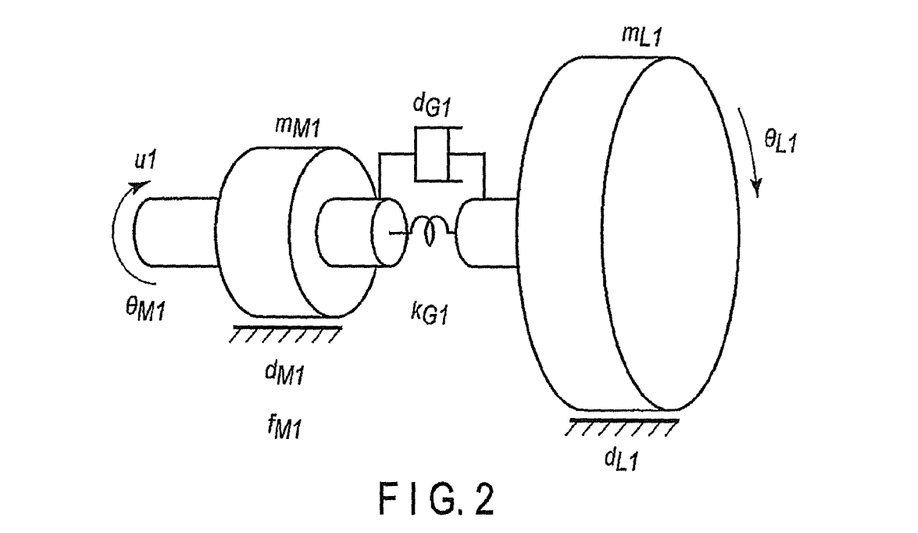
FIG. 2 is a schematic view showing one link of the robotic arm shown in FIG. 1.

FIG. 2 is a schematic view showing one link of this robotic arm. Referring to FIGS. 1 and 2, a nonlinear dynamic model can be created for this robotic arm, assuming a serial two-link arm having elastic joints. FIG. 2 shows, using the first axis as a representative, physical parameters (for example, the moment of inertia, the friction coefficient, and the spring modulus) required to describe a nonlinear dynamic model corresponding to one link. A nonlinear dynamic model of a serial two-link arm having elastic joints is given by:

Motor side $M_M \ddot{\theta}_M + D_M \dot{\theta}_M + f_M \mathrm{sgn}(\dot{\theta}_M) = Eu - N_G [K_G (N_G \theta_M - \theta_L) + D_G (N_G \dot{\theta}_M - \dot{\theta}_L)]$ Link side $M_L(\theta_L)\ddot{\theta}_L + c_L(\dot{\theta}_L, \theta L) + D_L \dot{\theta}_L = K_G(N_G \theta_M - \theta_L) + D_G(N_G \dot{\theta}_M - \dot{\theta}_L)$ (1)

$\theta_M = [\theta_{M1}, \theta_{M2}]^T$: Motor rotation angle (1, 2: axis numbers)
$\theta_L = [\theta_{L1}, \theta_{L2}]^T$: Link rotation angle
$a = [a_1, a_2]^T$: Link translational acceleration
$M_L(\theta_L) \in R^{2 \times 2}$: Link inertial matrix
$c_L(\dot{\theta}_L, \theta_L) \in R^{2 \times 1}$: Centrifugal force/coriolis force vector
$M_M = \mathrm{diag}(m_{M1}, m_{M2})$: Motor+decelerator high-speed phase inertia
$D_M = \mathrm{diag}(d_{M1}, d_{M2})$: Motor axis viscous friction coefficient
$D_L = \mathrm{diag}(d_{L1}, d_{L2})$: Link axis viscous friction coefficient
$K_G = \mathrm{diag}(k_{G1}, k_{G2})$: Decelerator spring modulus
$D_G = \mathrm{diag}(d_{G1}, d_{G2})$: Decelerator attenuation coefficient
$N_G = \mathrm{diag}(n_{G1}, n_{G2})$: Reduction gear ratio ($n_{G1}, n_{G2} \leq 1$)

$f_M = [f_{M1}, f_{M2}]^T$: Motor axis coulomb dynamic friction torque $E = \mathrm{diag}(e_1, e_2)$: Torque/voltage (current command value) constant $u = [u_1, u_2]^T$: Input voltage (command value to motor current control system)

A link inertia matrix is given by:

$$M_L(\theta_L) = \begin{bmatrix} \alpha + \beta + 2\gamma\cos(\theta_{L2}) & \beta + \gamma\cos(\theta_{L2}) \\ \beta + \gamma\cos(\theta_{L2}) & \beta \end{bmatrix} \quad (2)$$

where α, β, and γ are base parameters constituted by the link length, barycentric position, mass, and inertia (see H. Kobayashi et al.: Practice of Robot Control, Chapter 3 Robot Identification, Corona Publishing Co., Ltd., 1997, pp. 62-85 [literature 1]).

The centrifugal force/Coriolis force vector is given by:

$$c_L(\dot\theta_L, \theta_L) = \begin{bmatrix} -\gamma(2\dot\theta_{L1}\dot\theta_{L2} + \dot\theta_{L2}^2)\sin(\theta_{L2}) \\ \gamma\dot\theta_{L1}^2 \sin(\theta_{L2}) \end{bmatrix} \quad (3)$$

As a basic configuration, a motor angular velocity control system uses an equation which implements two-degrees-of-freedom PI control using feedforward-integral-proportional (FF-I-P) control as proportional-integral (PI) control, as per:

$$u_i = k_{FVi}\dot\theta_{MRi} + k_{IVi}\int(\dot\theta_{MRi} - \dot\theta_{Mi})dt - k_{PVi}\theta_{Mi} \quad (i=1,2) \quad (4)$$

$\dot\theta_{MRi}$: Motor angular velocity target value (i: axial number)
$\dot\theta_{Mi}$: Motor angular velocity
$k_{FVi}$: Motor angular velocity target value feedforward control gain
$k_{IVi}$: Motor angular velocity deviation integral feedback control gain
$k_{PVi}$: Motor angular velocity proportional feedback control gain
$u_i$: Input voltage (command value to motor current control system)

Figure 9:
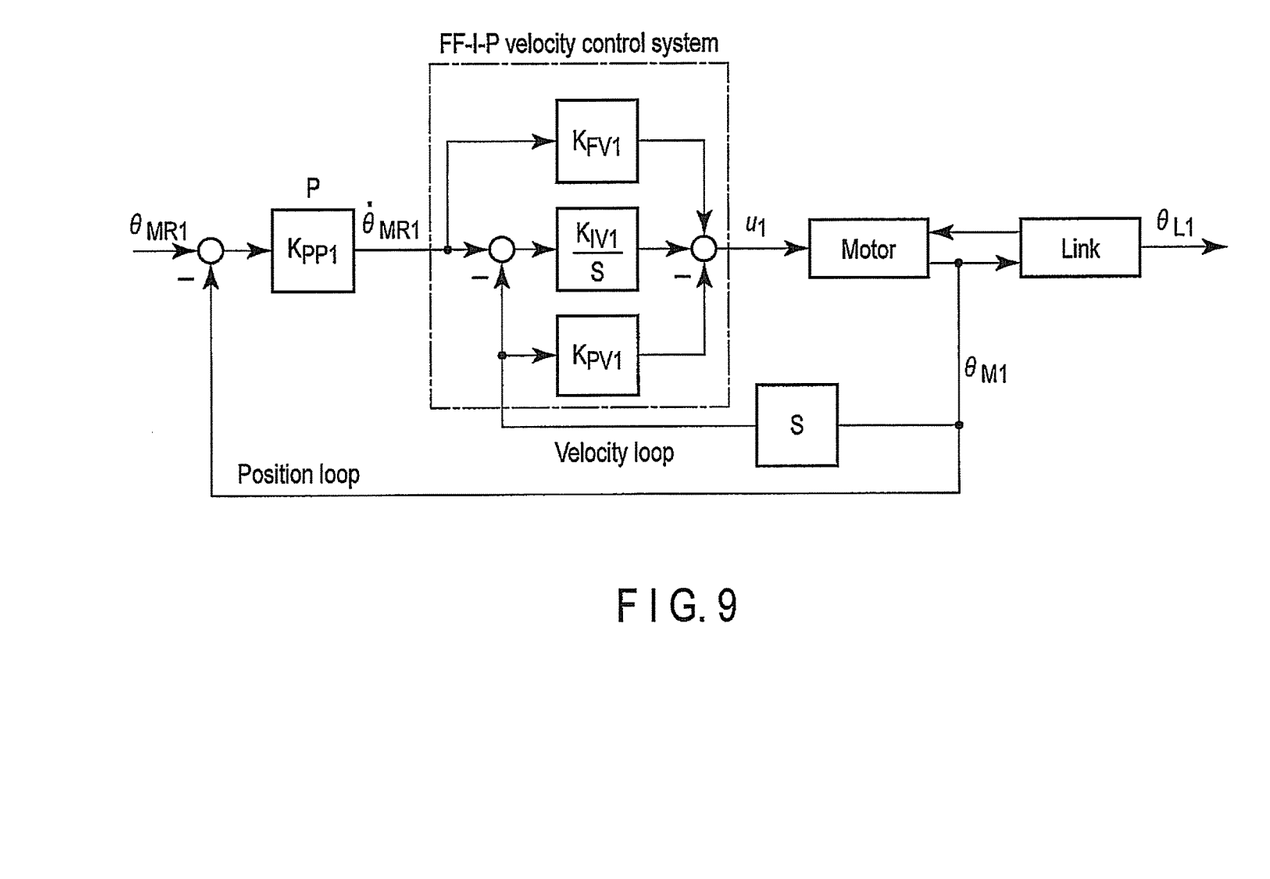
FIG. 9 is a block diagram showing a conventional position/velocity control system.

This two-degrees-of-freedom PI velocity control system is configured as a control system connected into a position control system (P control) by the cascade configuration, as shown in FIG. 9. In this embodiment, focusing attention on the motor angular velocity control system other than the position control system, a continuous system will be directly described, which assumes a sufficiently short control period.

Figure 10A:
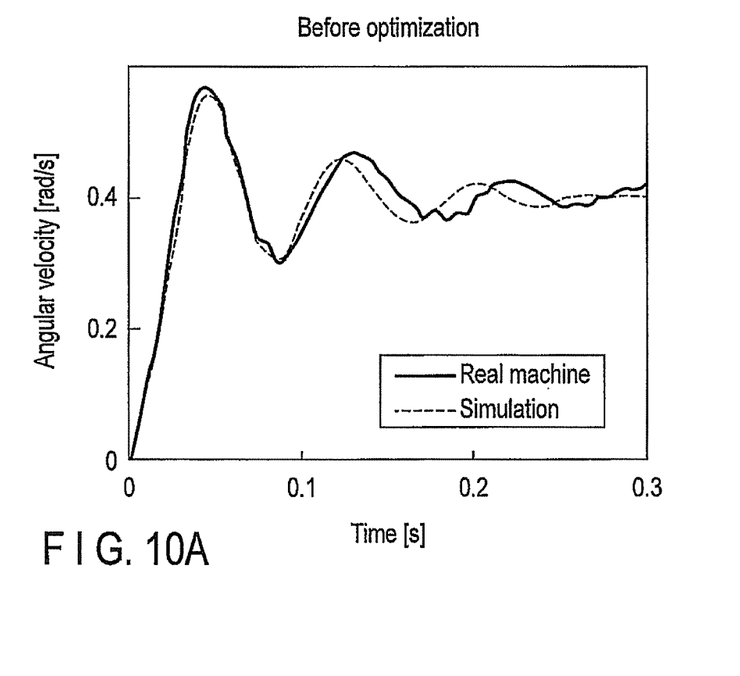
FIGS. 10A and 10B shows views of fine tuning of physical parameters using nonlinear optimization.
Figure 10B:
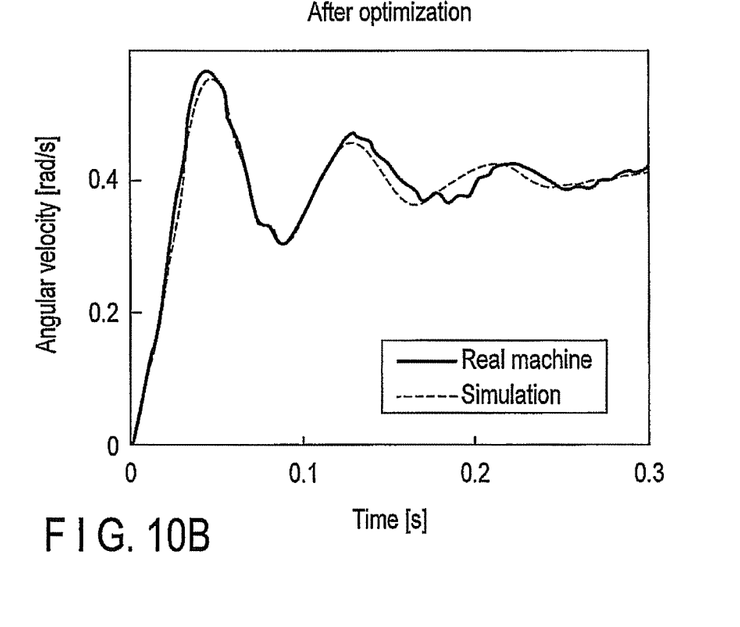

For example, assuming that an end effector load 12 of the two-link arm shown in FIG. 1 has a weight of 5 kg, the physical parameters (including the base parameters hereinafter) presented in equations (1), (2), and (3) are estimated using an identification method described in, for example, the above-mentioned literature 1 or Japanese Patent No. 2772064 which takes into consideration the joint rigidity of a robotic model. These physical parameters are substituted into equations (1) and (2) of the dynamic model, and equation (3) of the velocity feedback control rule, together with the motor velocity control gain used in equation (4), thereby building a time response simulator for the velocity control system of the serial two-link arm, and confirming whether the time response obtained by this system shows a good match with that of a real robotic machine. As long as the physical parameters are estimated with high accuracy in accordance with the above-mentioned identification method, these time responses are expected to match well. If these time responses show a slightly poor match, the physical parameters are finely tuned using optimization computation in accordance with a nonlinear least-squares method (for example, the Marquardt method) using the above-mentioned simulator. For example, FIG. 10A shows the angular velocity step response before optimization, and FIG. 10B shows that after optimization (the abscissa indicates time, the ordinate indicates the angular velocity, a solid line indicates the result obtained by a real robotic machine, and a broken line indicates the result obtained by a simulator). As shown in FIG. 10B, the angular velocity step responses of the simulator and real robotic machine can be matched well by optimizing the physical parameters.

It is an object of this embodiment to implement an observer which estimates the link angular velocity from the motor angular velocity measured by the above-mentioned encoder so as to feed back not only the measurement value of the motor angular velocity but also the estimated value of the link angular velocity, thereby accurately operating the observer while suppressing vibration of the distal end of the robotic arm.

In state feedback using the estimated value obtained by an observer, it is necessary to design/adjust the feedback gain of the observer itself, and the gain of state feedback. In the modern control theory, the poles of the observer are normally set more to the left side of those of state feedback, because feedback control is performed after state variables are reproduced.

However, in practice, such a high gain cannot be set for an observer having various types of noise and modeling errors. When the pole assignment of the observer is adjusted while checking the response of the real machine, the poles may eventually come close to those of state feedback. In this case, the use of the Kalman filter allows systematic design of an observer, but this requires parameter settings of an assumed noise model. Further, in robust control such as H∞ control (H infinity control) without two-phase control system design that includes an observer and state feedback, the control system design can be done by explicitly considering various types of noise and modeling errors. However, in both the methods, manual adjustment on the site is difficult because a computer-aided engineering (CAE) tool is indispensable.

Hence, in this embodiment, focusing attention on the fact that the time responses of simulation and a real robotic machine under velocity control match well, an observer is configured by taking advantage of high estimation accuracy of the physical parameters. An observer according to this embodiment will be described below in accordance with each Example.

Example 1

Figure 3:
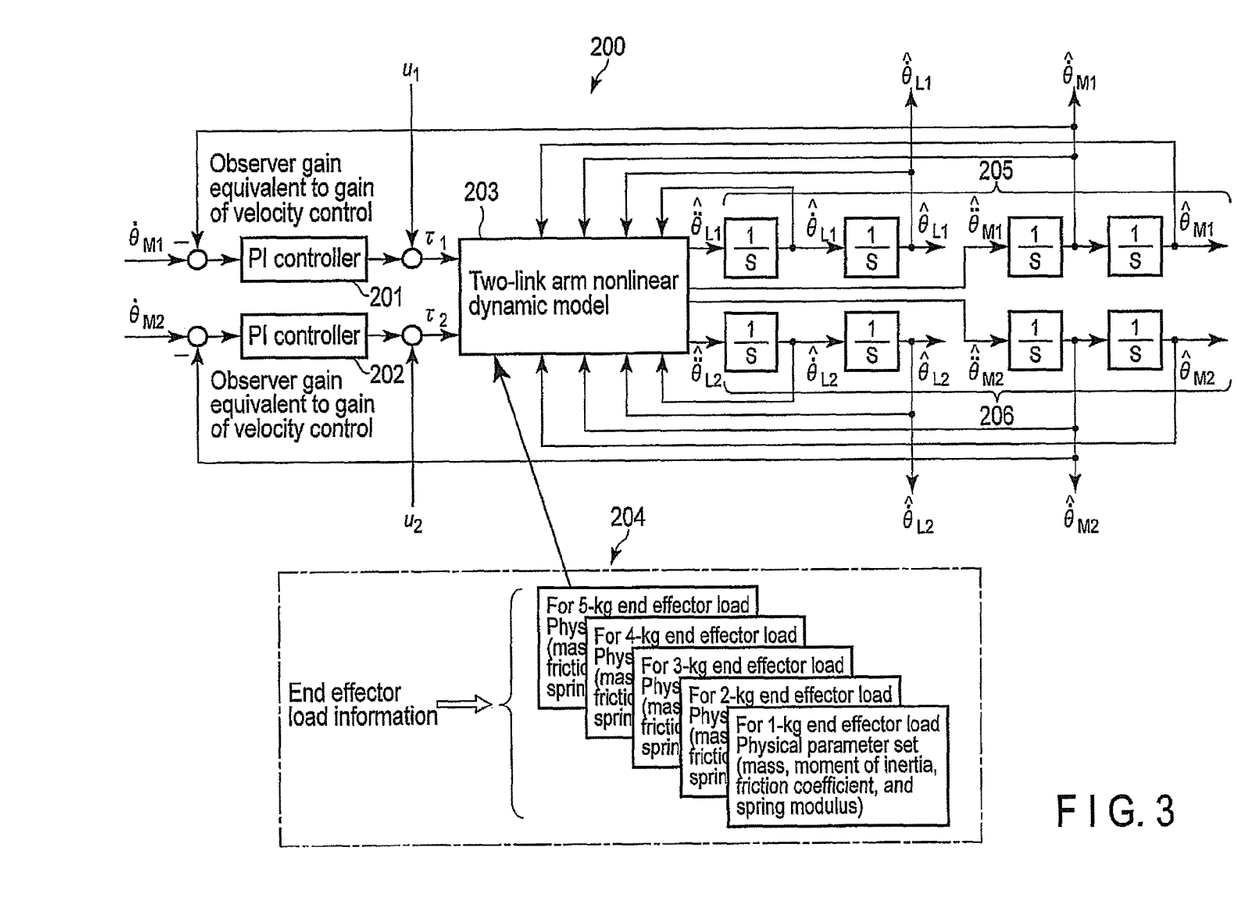
FIG. 3 is a block diagram showing an observer in Example 1.

FIG. 3 is a block diagram showing an observer in Example 1. An observer unit 200 includes PI controllers 201 and 202, a two-link arm nonlinear dynamic model 203, a physical parameter switching unit 204, and integrator groups 205 and 206 which calculate the second-order integral of the nonlinear dynamic model 203. That is, the observer unit 200 shown in FIG. 3 serves as a simulator which includes the entire nonlinear dynamic model 203 of the robotic arm, and directly uses the PI control gain of the existing velocity control system for each axis of the robotic arm as the observer gains of the PI controllers 201 and 202. The observer unit 200 also has an internal function of setting the stationary error of the output estimated value to zero as integral control is used. This entails no engineering cost associated with approximation and gain adjustment in observer implementation.

A PI control observer based on this nonlinear dynamic model is expressed as a second-order derivative obtained by transforming equations (1), (2), and (3), as per:

$$\ddot{\hat{\theta}}_M = M_M^{-1}\{-D_M \dot{\hat{\theta}}_M - f_M \operatorname{sgn}(\dot{\hat{\theta}}_M) + \\ E\tau - N_G[K_G(N_G\hat{\theta}_M - \hat{\theta}_L) + D_G(N_G\dot{\hat{\theta}}_M - \dot{\hat{\theta}}_L)]\} \quad (5)$$

$$\ddot{\hat{\theta}}_L = M_L(\hat{\theta}_L)^{-1}[-c_L(\dot{\hat{\theta}}_L, \hat{\theta}_L) - D_L\dot{\hat{\theta}}_L + K_G(N_G\hat{\theta}_M - \hat{\theta}_L) + \\ D_G(N_G\dot{\hat{\theta}}_M - \dot{\hat{\theta}}_L)]$$

$$\tau = K_{PV}(\dot{\theta}_M - \dot{\hat{\theta}}_M) + K_{IV}\int(\dot{\theta}_M - \dot{\hat{\theta}}_M)dt + u$$

$\dot{\theta}_M = [\dot{\theta}_{M1}, \dot{\theta}_{M2}]^T$: Motor angular velocity input to observer
$u = [u_1, u_2]^T$: Input to observer (motor current command value)
$K_{PV} = \operatorname{diag}(k_{PV1}, k_{PV2})$: Velocity deviation proportional control gain
$K_{IV} = \operatorname{diag}(k_{IV1}, k_{IV2})$: Velocity deviation integral control gain
$\tau = [\tau_1, \tau_2]^T$: Input within observer (motor current command value)
where ^ represents the estimated value.

As the observer gains of the PI controllers 201 and 202, the gains of P and I of FF-I-P control (two-degrees-of-freedom PI control) of the velocity loop of the real machine are selected. In this case, one degree of freedom of the trackability of the observer need only be taken into consideration, so FF=P is set for PI control. This system is one type of nonlinear observer having a constant gain. Also, since the stationary error of the output estimated value becomes zero as integral control is used, the PI controllers 201 and 202 also have the function of a disturbance rejecting observer. State estimation can be performed by building equations (5) into the control device 13, and calculating a second-order integral (a numerical integral in practice) by the integrator groups 205 and 206 shown in FIG. 3 in real time.

In two-inertia system angular velocity control, when three quantities of state: the motor angular velocity, the link angular velocity, and the axial torsional angle between the motor and the link are fed back, arbitrary pole assignment becomes possible, so quick response characteristics and attenuation coefficient can be freely set. However, since readjustment of the existing PI control system is involved, the shift toward the pole assignment scheme is difficult. Hence, in this embodiment, as a plug-in to the PI control system, state feedback is performed only for the axial torsional angular velocity estimated value (the difference between the link angular velocity and the motor angular velocity). In this axial torsional angular velocity feedback operation, an effect of increasing only the attenuation coefficient without changing the gain cross-over frequency of PI control is expected to be obtained (H. Sugimoto et al.: "Practice of Theory and Design for AC Servo-System", Chapter 7 Design of Velocity Control System and Position Control System, Sogo Denshi Shuppansha, 1990, pp. 153-179), and manual adjustment on the site is easy, so this operation can readily be introduced especially to an industrial robotic controller.

Figure 4:
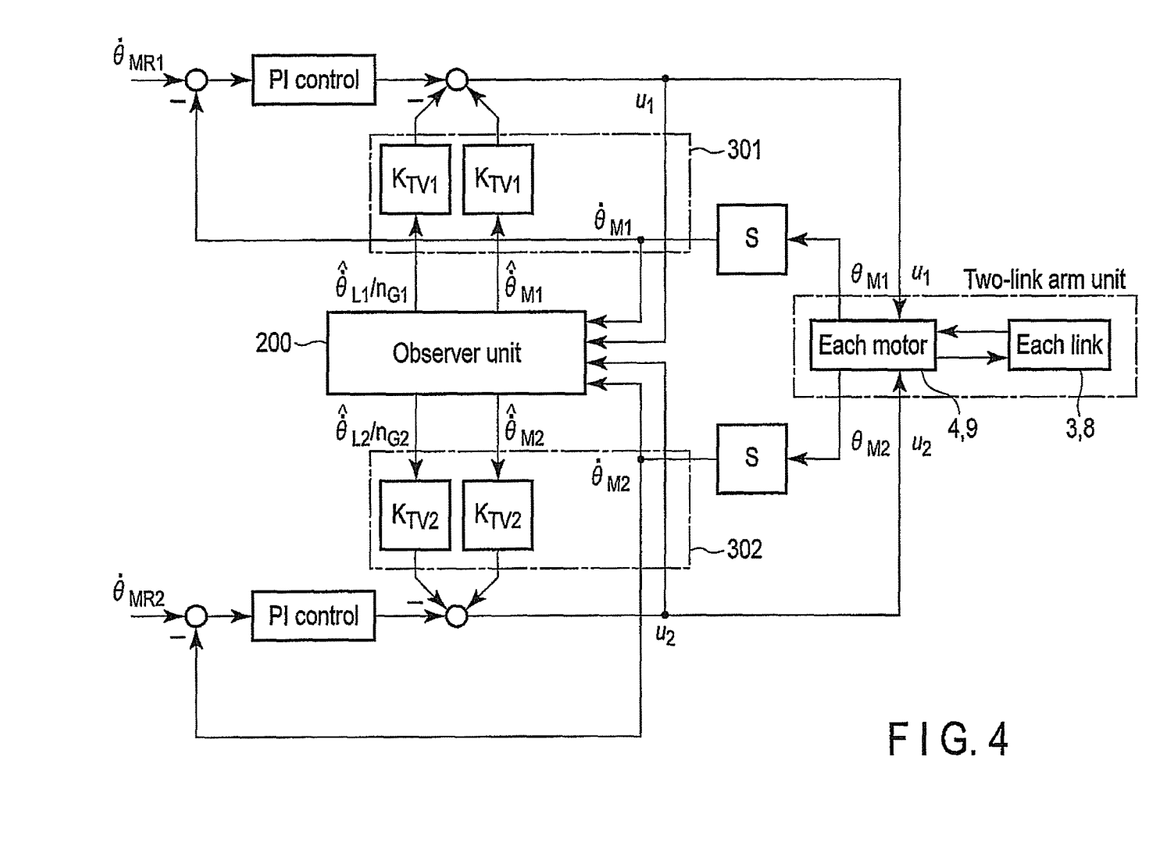
FIG. 4 is a block diagram of state feedback control using the observer in Example 1.

FIG. 4 is a block diagram of state feedback control using the observer unit 200 shown in FIG. 3. The observer unit 200 receives the motor angular velocity (encoder difference) and a voltage (current command value) input to the motor driver. State feedback units 301 and 302 for axial torsional angular velocity estimated values obtained by the PI control observer unit 200 can be achieved by the plug-in to FF-I-P control described by equation (4) in accordance with a control rule as:

$$u_i = k_{FVi}\dot{\theta}_{MRi} + k_{IVi}\int(\dot{\theta}_{MRi} - \dot{\theta}_{Mi})dt - \\ k_{PVi}\dot{\theta}_{Mi} - k_{TVi}(\dot{\hat{\theta}}_{Li}/n_{G1} - \dot{\hat{\theta}}_{Mi}) \quad (i = 1, 2) \quad (6)$$

$K_{TVi}$: Feedback control gain of axial torsional angular velocity estimated value As is obvious from simulations and experiments to be described later, it is easy to manually adjust the feedback control gain $k_{TVi}$ of the axial torsional angular velocity estimated value while checking the time response waveform. Also, since an observer based on an accurate nonlinear dynamic model of a robotic arm with elastic joints is used, a satisfactory effect can be provided only by state feedback of the first axis in vibration suppression control of a robotic arm constituted by a serial link.

As for variations in end effector load and those in frictional force following them, the physical parameter switching unit 204 switches the physical parameter set of the nonlinear dynamic model 203 (gain scheduling) to make the vibration suppression performance robust, independently of the variations in end effector load/frictional force, as shown in FIG. 3. To explicitly switch the physical parameter set, it is only necessary to use a robot language such as "Payload (5 kg)" and use it at the timing at which the end effector load changes.

In an example shown in FIG. 3, the physical parameter switching unit 204 requires physical parameter sets for five end effector loads: 5, 4, 3, 2, and 1 kg. However, as long as a physical parameter set for 5 kg is estimated with high accuracy, that for an end effector load of 4 kg can be generated in accordance with the above-mentioned nonlinear optimization method. Physical parameter sets of 3, 2, and 1 kg can be generated from those of 4, 3, and 2 kg, respectively, in the same manner.

Figure 5A:
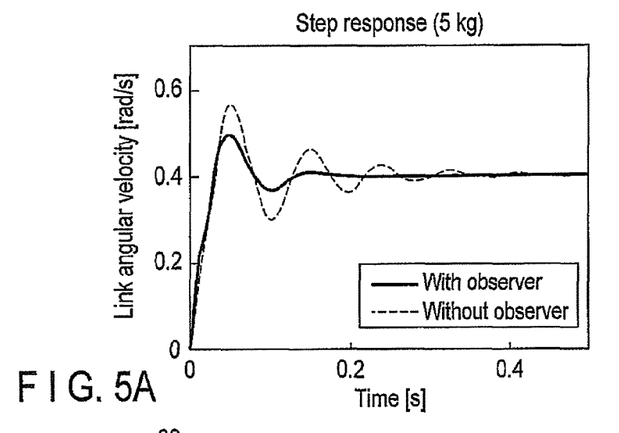
FIGS. 5A, 5B, 5C and 5D shows graphs of the effects of vibration suppression control in Example 1.
Figure 5B:
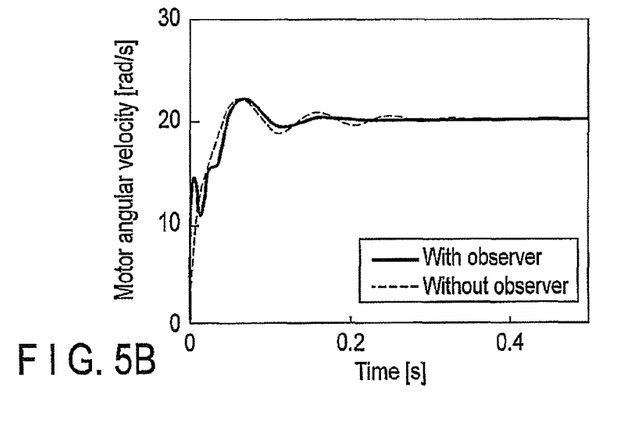

FIGS. 5A and 5B shows a comparison in velocity step response waveform for the first axis between execution and non-execution of axial torsional feedback control when the end effector load is 5 kg. FIG. 5A shows the link angular velocity, and FIG. 5B shows the motor angular velocity. As can be seen from FIGS. 5A and 5B, the improvement in response characteristics of the link angular velocity is more significant in this embodiment (with an observer) than in FF-I-P control alone (without an observer).

Figure 5C:
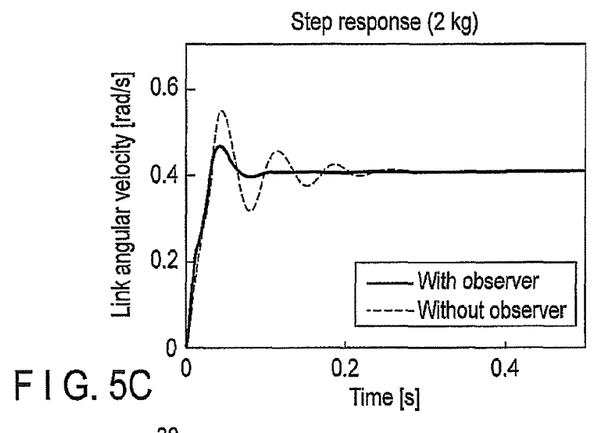
Figure 5D:
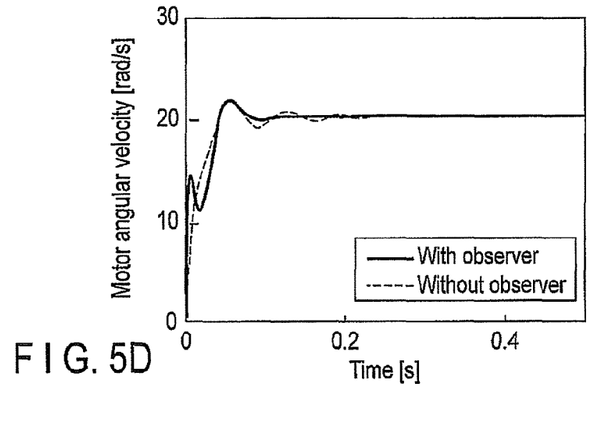

FIGS. 5C and 5D shows a comparison in velocity step response waveform for the first axis between execution and non-execution of axial torsional feedback control when the end effector load is 2 kg. FIG. 5C shows the link angular velocity, and FIG. 5D shows the motor angular velocity. Since the physical parameter set is switched in accordance with the end effector load, the improvement in response characteristics of the link angular velocity is more significant in this embodiment (with an observer) than in FF-I-P control alone (without an observer), as in the case of 5 kg.

Example 2

Figure 6:
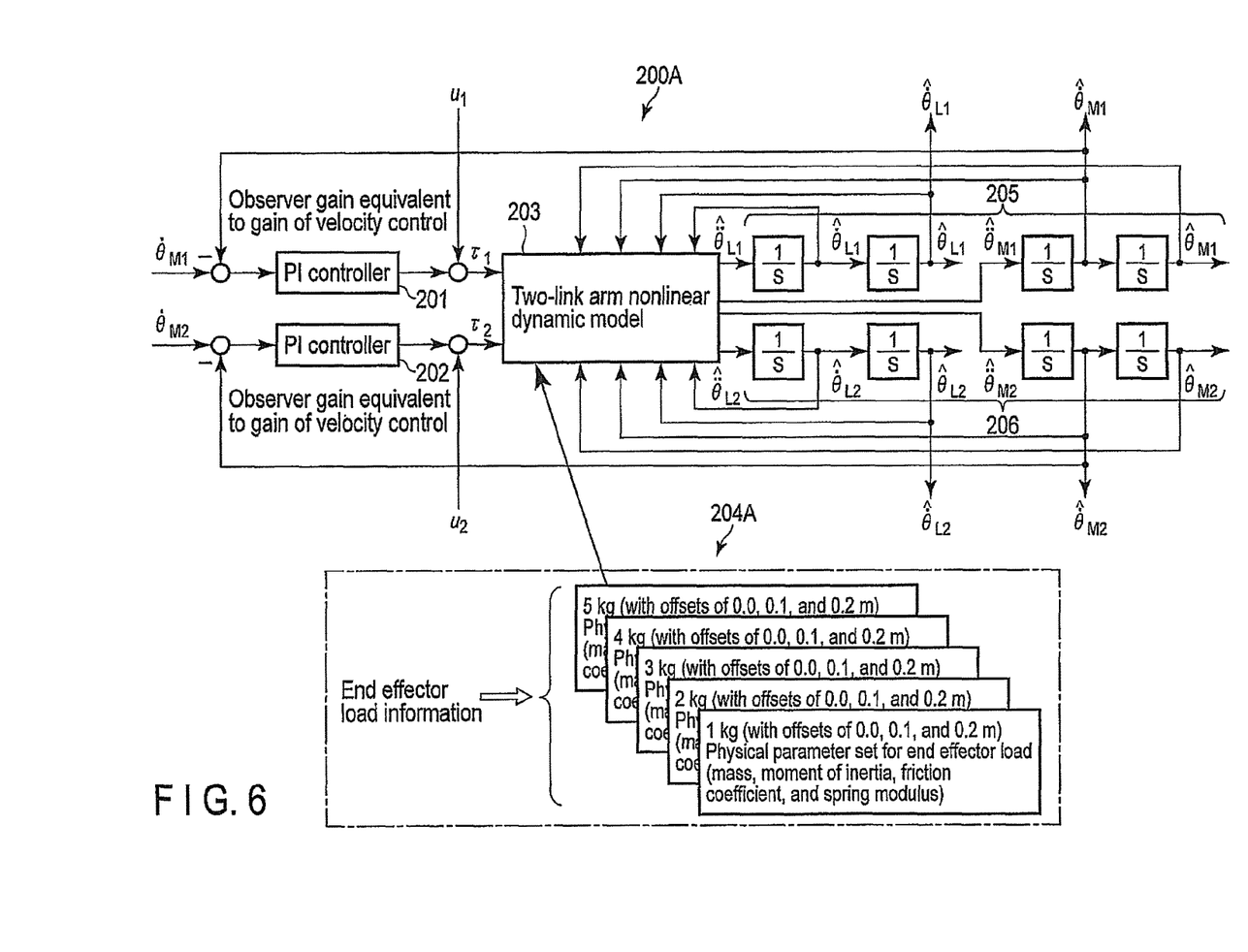
FIG. 6 is a block diagram showing an observer in Example 2.

FIG. 6 shows an observer in Example 2. In an observer unit 200A of Example 2, the mounting position of an end effector load has an offset. In this case, the moment of inertia of the end effector load considerably changes, so a physical parameter switching unit 204A schedules physical parameters which take into consideration the amounts of offset (for example, three types: 0.0, 0.1, and 0.2 m), as shown in FIG. 6. It is only necessary to use a robot language such as "Payload (5 kg, 0.1 m)" and use it at the timing at which the end effector load changes.

Example 3

Figure 7:
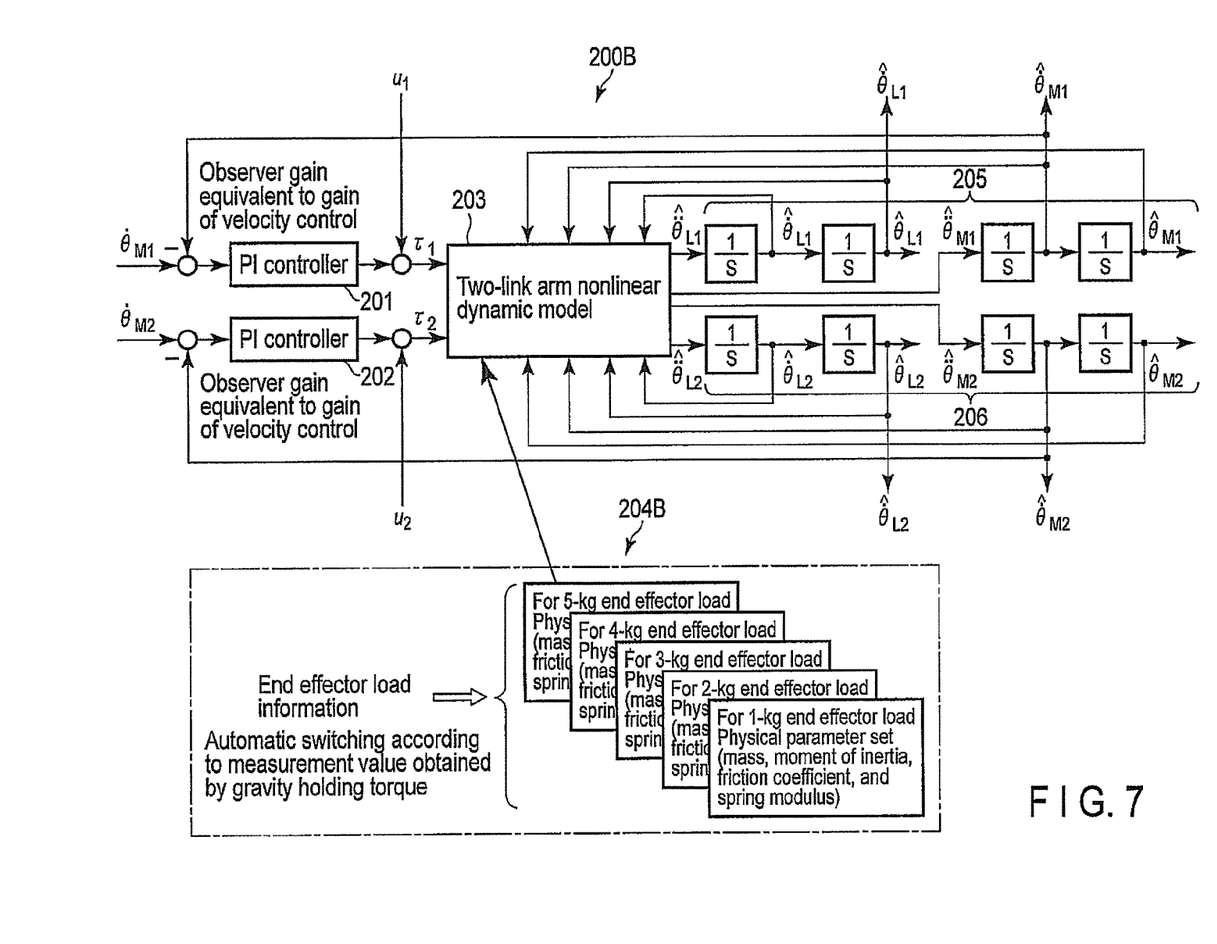
FIG. 7 is a block diagram showing an observer in Example 3.

FIG. 7 shows an observer in Example 3. An observer unit 200B in Example 3 is implemented by applying the observer unit 200 in the above-mentioned Example 1. A physical parameter switching unit 204B automatically acquires end effector load information for a robotic arm provided with a shaft applied with gravity. Variations in end effector load are obtained by measurement using the gravity holding torque of the upper and lower axes (for example, the third axis of a scalar robot) of the distal end of the arm every time the robot comes to rest, as shown in FIG. 7. A robot language such as "EnableAutoPayload" or "DisableAutoPayload" may be used to automatically determine whether the physical parameter set is to be switched.

Example 4

Figure 8:
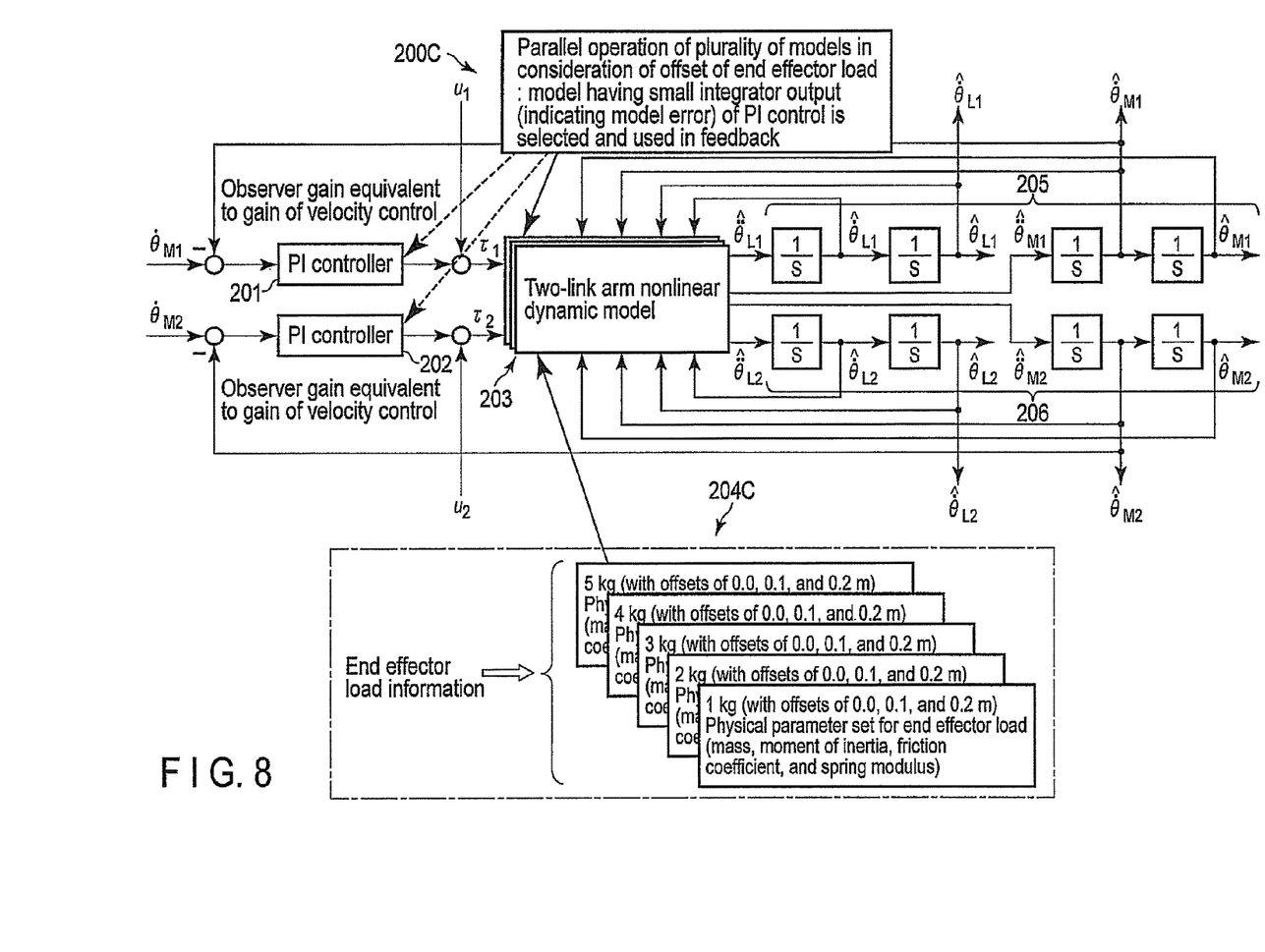
FIG. 8 is a block diagram showing an observer in Example 4.

FIG. 8 shows an observer in Example 4. An observer unit 200C in Example 4 is obtained by applying the observer unit 200A in the above-mentioned Example 2. If an end effector load is mounted with an offset, the moment of inertia considerably changes, but end effector load information cannot be obtained using only the gravity holding torque. Therefore, as shown in FIG. 8, a physical parameter switching unit 204C prepares a physical parameter group when the same end effector load mass and different offsets (for example, three types: 0.0, 0.1, and 0.2 m) are set, and a plurality of nonlinear dynamic models 203 are operated in parallel. State feedback units 301 and 302 select a model in which the integrator outputs (the existence of this value means that the dynamic model has an error) of PI controllers 201 and 202 of the observer have small absolute values, and use it for state feedback.

Note that when the state feedback units 301 and 302 cannot narrow down the models to one as the integrator outputs have close values, it is possible to weight the axial torsional angular velocity estimated value obtained by the observer based on a plurality of models, and feed it back.

Example 5

The above-mentioned frictional force varies depending not only on the end effector load but also on the temperature. In Example 5, for example, physical parameter sets are estimated at ambient temperatures of 0, 10, 20, and 30° C., and switched from each other in accordance with the value of a thermometer set around a robotic arm. To simultaneously switch the above-mentioned end effector load and its amount of offset, it is only necessary to create a three-dimensional table which uses the end effector load, the amount of offset, and the temperature as parameters.

As described above, according to this embodiment, in a vibration suppression control technique for the distal end of a multi-link robotic arm, it is possible to considerably reduce the engineering cost of an observer which estimates the link angular velocity from the motor angular velocity. It is also possible to provide a robust vibration suppression performance even if the robot has variations in end effector load/frictional force.

A configuration in which a controller includes an entire simulator based on a nonlinear dynamic model in this embodiment is used in the field of process control in which the time axis is 100 or more times that of a robot. However, this method is intended to optimally perform set-point control (of, for example, the liquid level, pressure, and temperature) in the future from the viewpoint of, for example, energy saving, and is not suitable for servo control for exhibiting a given target value trackability in real time for, for example, a robot.

Since a method described in, for example, Jpn. Pat. Appln. KOKOKU Publication No. 7-120212 uses an observer based on some kind of approximation in a nonlinear dynamic model, it can obtain champion data but cannot obtain a robust vibration control performance over a wide operation range. Also, this method entails a high engineering cost to, for example, reduce the amount of computation and adjust the observer gain.

In addition, motor drive manufacturers propose a variety of schemes including the vibration suppression control scheme, and its adaptive control/auto-tuning scheme. However, these schemes are based on a general-purpose observer for "Elastic Joint Model for Each Link+Disturbance Estimation" for each link assuming the motor load, and therefore provide a performance inferior to that of a scheme which explicitly takes into consideration a multi-link robotic arm dynamic model, as a matter of course.

In contrast to this, in this embodiment, an observer that does not use approximation based on a nonlinear dynamic model is used, and gain scheduling of physical parameters corresponding to variations in end effector load/frictional force is also performed, so a robust vibration control performance is obtained over a wide operation range. Also, variations in frictional force following those in end effector load are taken into consideration as well, and gain scheduling is performed using not only the mass and inertia but also the friction coefficient. Moreover, it is unnecessary to design the observer gain, so the engineering cost can be kept low.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robotic control apparatus including an angular velocity control system, a controlled object of the apparatus being a robotic arm including an elastic mechanism between a rotation axis of a motor and a rotation axis of a link, the apparatus comprising:

a physical parameter switching unit configured to switch a physical parameter set including a moment of inertia, a friction coefficient and a spring modulus which are set for a nonlinear dynamic model of the robotic arm, in accordance with a value of a mass of an end effector load of the robotic arm, the physical parameter set being included in the physical parameter switching unit;

an observer unit configured to receive an angular velocity of the motor and a current command value input to the motor, and calculate an integral of the nonlinear dynamic model in real time, and estimate an angular velocity of the link based on a simulation model of a motor angular velocity control system which undergoes gain proportional-integral control equivalent to proportional-integral control of the angular velocity control system; and a state feedback unit configured to calculate an axial torsional angular velocity based on a difference between the angular velocity of the motor and the angular velocity of the link, and feed the calculated axial torsional angular velocity back to the angular velocity control system.

2. The apparatus according to claim 1, wherein the physical parameter switching unit switches the physical parameter set in accordance with the value of the mass of the end effector load and a value of an amount of offset of a mounting position of an end effector load from a center of mass of an end effector load.

3. The apparatus according to claim 1, further comprising:
a torque measuring unit configured to measure a gravity holding torque of the motor,
wherein the physical parameter switching unit switches the physical parameter set in accordance with the measurement value obtained by the torque measuring unit.

4. The apparatus according to claim 2, wherein
the observer unit calculates integrals of a plurality of nonlinear dynamic models corresponding to the value of the amount of offset in real time, and
the state feedback unit selects a nonlinear dynamic model having an integrator output of the proportional-integral control, and feeds the selected nonlinear dynamic model back to the angular velocity control system, the integretor output being smallest absolute values among values of the integrals.

5. The apparatus according to claim 2, wherein
the observer unit calculates integrals of a plurality of nonlinear dynamic models corresponding to the value of the amount of offset in real time, and
the state feedback unit weights axial torsional angular velocities acquired from the plurality of nonlinear dynamic models.

6. The apparatus according to claim 1, further comprising:
a temperature measuring unit configured to measure an ambient temperature of the robotic arm,
wherein the physical parameter switching unit further switches the physical parameter set in accordance with the temperature measured by the temperature measuring unit.

* * * * *